(No Model.) 3 Sheets—Sheet 3.
T. G. MANDT.
RUNNING GEAR FOR VEHICLES.
No. 380,213. Patented Mar. 27, 1888.
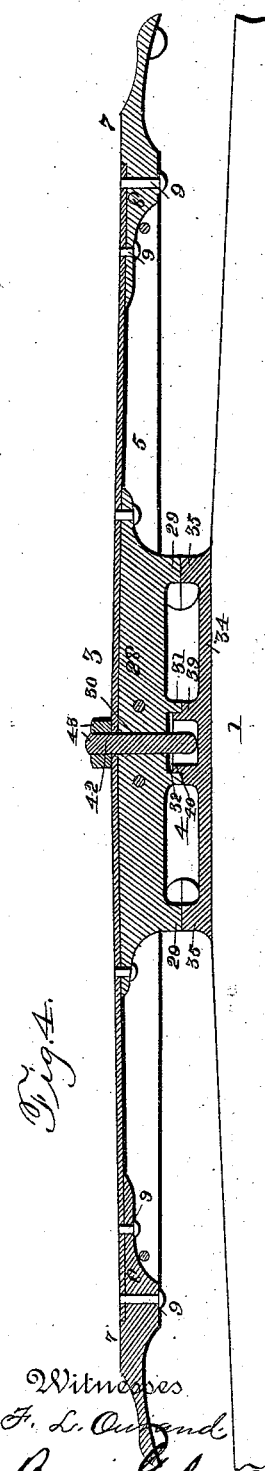
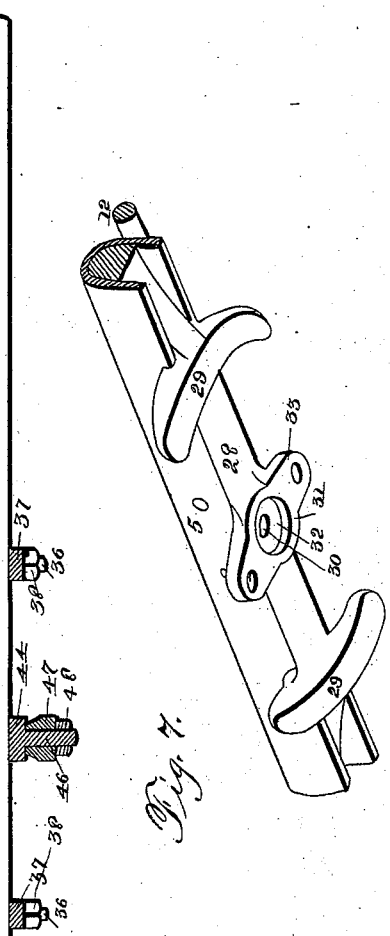
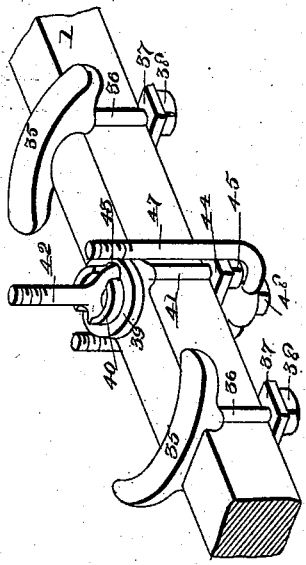
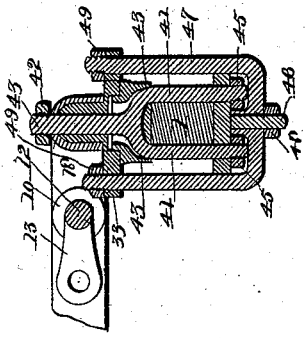
Witnesses
Inventor,

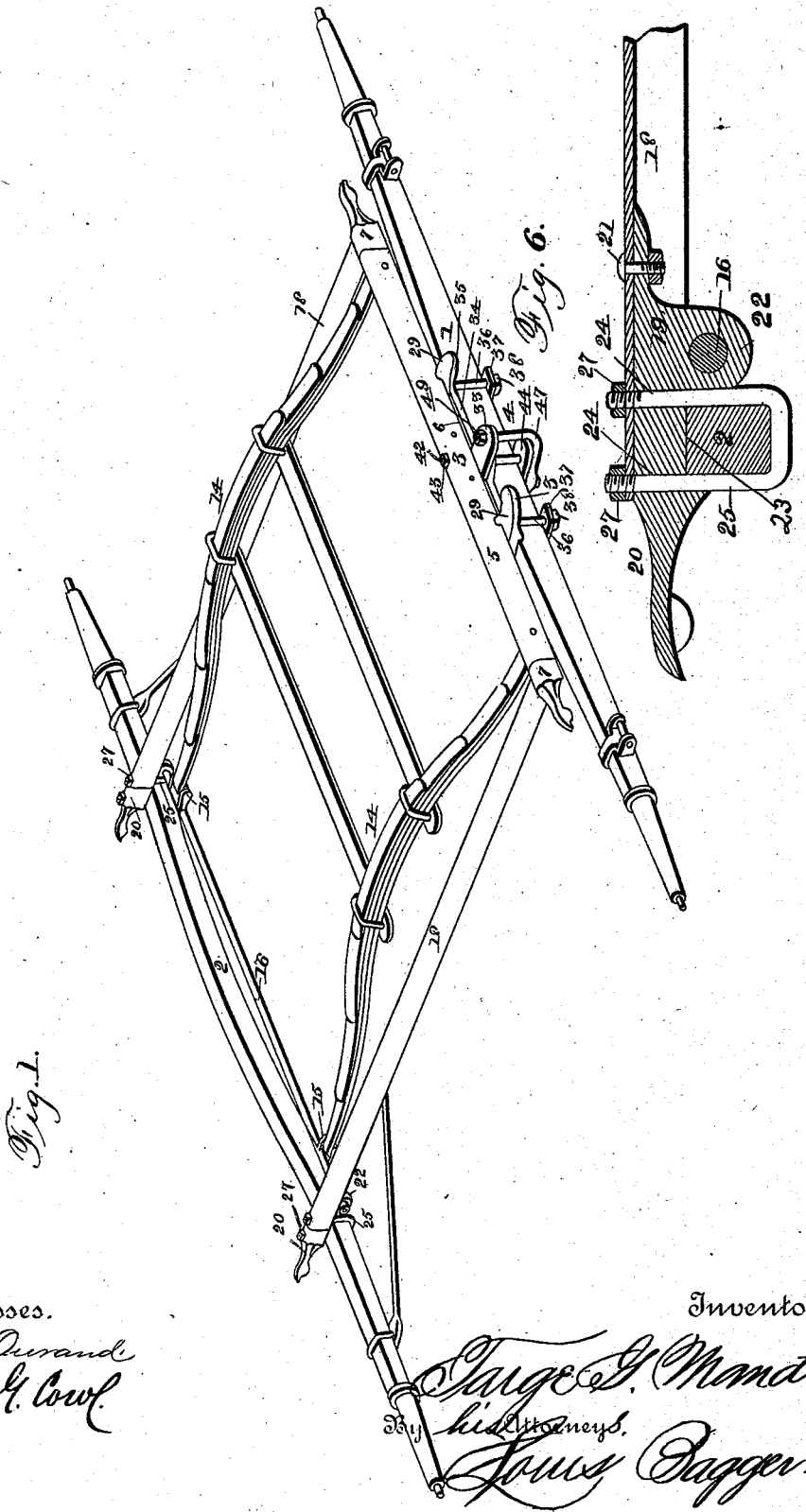

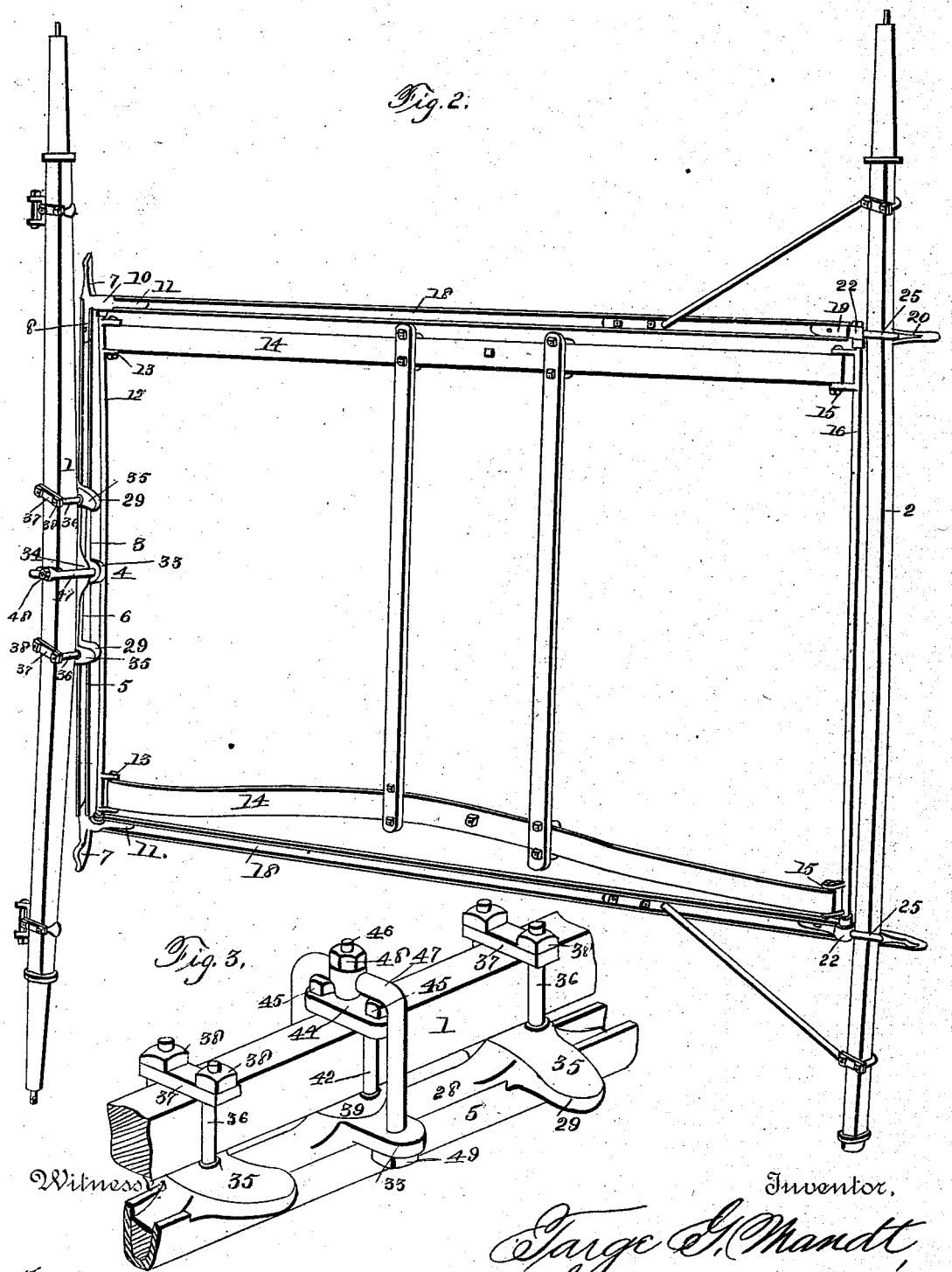

UNITED STATES PATENT OFFICE.

TARGE G. MANDT, OF STOUGHTON, WISCONSIN.

RUNNING-GEAR FOR VEHICLES.

SPECIFICATION forming part of Letters Patent No. 380,213, dated March 27, 1888.

Application filed June 30, 1887. Serial No. 243,000. (No model.)

*To all whom it may concern:*

Be it known that I, TARGE G. MANDT, a citizen of the United States, and a resident of Stoughton, in the county of Dane and State of Wisconsin, have invented certain new and useful Improvements in Running-Gear for Vehicles; and I do hereby declare that the following is a full, clear, and exact description of the invention, which will enable others skilled in the art to which it appertains to make and use the same, reference being had to the accompanying drawings, which form a part of this specification, and in which—

Figure 1 is a perspective view of my improved running-gear for vehicles. Fig. 2 is a perspective bottom view of the same. Fig. 3 is a perspective detail view, on an enlarged scale, of the fifth-wheel inverted. Fig. 4 is a longitudinal sectional view of the head-block and axle. Fig. 5 is a transverse sectional view of the same. Fig. 6 is a sectional detail view of the rear end of one of the side bars, and Fig. 7 is a perspective detail view of the parts of the fifth-wheel, showing them separated.

Similar numerals of reference indicate corresponding parts in all the figures.

My invention has relation to metallic running-gear for vehicles; and it consists, first, in the improved construction and combination of parts of a metallic running-gear composed of steel bars bent to U shape in cross-section, and, secondly, in the construction and combination of a fifth-wheel for the said gear, as hereinafter more fully described and claimed.

In the accompanying drawings, the numerals 1 and 2 indicate, respectively, the front and rear axle, and the head-block 3 is pivotally attached to the front axle by the fifth-wheel 4, which will be more fully described later on.

The head-block is formed by a flat strip or bar of steel, 5, bent longitudinally to be U-shaped, or approximately so, in cross-section, and the upper block, 6, of the fifth-wheel is fitted into the middle of the bar by means of suitable screws or rivets. Solidly-cast tips 7 have their inner slightly reduced or shouldered ends, 8, secured in the ends of the bar by means of bolts or rivets 9, passing through the said ends and the ends of the bar, and the outer portions of these tips are preferably ornamentally shaped and provided with rearwardly-projecting transverse eyes 10, having narrow blocks or bars 11 projecting from them. The ends of a rod, 12, are secured in the eyes 10, and this rod is provided with two pairs of rearwardly-projecting perforated ears, 13, between which the forward ends of the springs 14 are secured, the rear ends of the said springs being secured between similarly-perforated ears 15, projecting forward from a bar, 16, secured parallel to the rear axle.

The side bars, 18, which are formed by a doubled flat bar or strip of steel, U-shaped, or approximately so, in cross-section, are secured with their ends to the reduced blocks or bars 11, projecting from the ends of the head-block, and the rear ends of these side bars are secured to the reduced forward ends, 19, of tips 20, the said reduced ends fitting into the ends and being secured by means of rivets or bolts 21. Transverse eyes 22 are formed upon the under sides of these reduced portions of the tips, and the transverse bar 16, having the rear ends of the springs secured to it, is secured with its ends in the said eyes. The reduced portions of the tips are formed with transverse recesses 23 in their under sides to the rear of the eyes, and have vertical perforations 24 at the ends of the recesses, through which the arms of clips 25 pass, the said clips straddling the rear axle from the under side and clamping it to the rear ends of the side bars, having shackles 26 and nuts 27 upon their upper ends. The springs are semi-elliptical and have the body of the vehicle secured upon their upwardly-curved middles.

The upper block of the fifth-wheel consists of the portion 28, fitted and secured in the hollow of the head-block, and the under side of this portion is provided near the ends with two segmental bars, 29, flat upon the under side and projecting transversely to the head-block, being concentric with the central king-bolt perforation, 30, of the head-block and upper fifth-wheel portion, which perforation passes through the head-block and fifth-wheel block. The central portion of the under side of the fifth-wheel block is provided with a circular disk, 31, having a circular recess, 32, concentric with the king-bolt perforation, and having two forwardly and rearwardly projecting perforated ears, 33.

The lower fifth-wheel block, 34, is secured upon the middle of the front axle and has at its ends two transverse segmental bars, 35, flat upon their upper sides and registering with and bearing against the similar bars upon the upper block, and bolts 36 project down at both sides of the axle from these bars and have shackles 37 and nuts 38, for clamping the lower block to the axle. The central portion of this lower block is formed with a circular disk, 39, having an upwardly-projecting circular flange, 40, which may fit into the recess in the upper block and turn in the same, and the bifurcated lower ends, 41, of the king-bolt 42 pass down through diametrically-opposite perforations 43 in the disk and flange, straddling the axle, while the upper end of the king-bolt fits and turns in the king-bolt perforation in the upper block, and has a nut, 43, upon the upper threaded end bearing against the head-block.

The lower ends of the bifurcated king-bolt pass through a shackle, 44, bearing against the under side of the front axle, having nuts 45 upon their ends, and this shackle is provided with a downwardly-projecting bolt, 46, upon its middle, upon which a long bail or yoke, 47, may turn with its perforated middle, the said yoke being secured from dropping down by a nut, 48, upon the bolt. The upper ends of the bail-shaped yoke are inserted through the forwardly and rearwardly projecting perforated ears of the upper block and have nuts 49 upon them bearing against the upper sides of these ears.

It will be seen that by having the head-block and the side bars formed by the longitudinally bent or doubled flat steel bars U-shaped in cross-section the said portions of the running-gear will combine lightness with strength, and by their being hollow they will possess more elasticity than the solid metallic bars occasionally used in the construction of these parts in vehicles, while their being made from metal, and preferably from steel, will admit of their being made lighter and at the same time stronger than the same parts made from wood.

In the fifth-wheel the strain will be taken from the king-bolt by the bail-shaped yoke or stirrup being secured to the upper block and to the bolt upon the under side of the axle, the said yoke or stirrup serving to hold the axle to the head-block, the only function of the upper end of the king-bolt being to form a pivot for the axle without any strain being upon it.

The lower bifurcated ends of the king-bolt serve to secure the king-bolt to the axle, and at the same time they serve to secure the lower block of the fifth-wheel to the axle and to secure the pivotal bolt for the stirrup, and the circular flange of the lower block revolving in the recess in the upper block will serve to form a strong pivot for the axle and to prevent any lateral play between the moving parts, the said flange and recess, together with the yoke or stirrup, admitting of the vehicle safely finishing its trip, and being capable of turning and of all movements, even if the king-bolt by accident should break or wear out.

Having thus described my invention, I claim and desire to secure by Letters Patent of the United States—

1. In a running-gear for vehicles, the combination of a head-block formed by a longitudinally-doubled flat metallic bar or strip U-shaped in cross-section, end tips having their reduced inner ends secured in the ends of the head-block and formed with rearwardly-extending blocks or bars having transverse eyes at the inner ends, side bars formed by longitudinally-doubled flat metallic bars or strips U-shaped in cross-section and secured with their forward ends to the rearwardly-extending bars or blocks of the end tips, end tips fitting in the rear ends of the side bars and having transverse downwardly-projecting eyes and transverse recesses, a rear axle resting in the recesses and secured to the blocks by means of clips and shackles passing through perforations in the blocks at both ends of the recesses, transverse rods secured with the ends in the eyes of the end tips of the head-block and of the side bars and having inwardly-projecting perforated ears, and semi-elliptical springs having their ends secured between the perforated ears, as and for the purpose shown and set forth.

2. In a running-gear for vehicles, the combination of an upper fifth-wheel block formed with segmental bars at its ends and with a concentrically-recessed circular disk at its middle, a lower block having segmental bars at the ends registering with and bearing against the bars of the upper block and formed with a central circular disk having a circular flange fitting in the recess of the upper block, and a king-bolt passing through the lower block and turning in a central perforation of the upper block, as and for the purpose shown and set forth.

3. In a running-gear for vehicles, the combination of an upper fifth-wheel block having a central disk formed with a circular recess and with a central king-bolt perforation and with forwardly and rearwardly extending perforated ears and having transverse segmental bars at the ends concentric with the disk and perforation, a lower fifth-wheel block provided at the ends with transverse segmental bars registering with the similar bars upon the upper block and bearing against them and formed with a central disk formed with a circular flange projecting and turning in the recess of the upper block and formed with two diametrically-opposite perforations, a bifurcated king-bolt having its upper nutted end secured pivotally in the king-bolt perforation and having its lower ends inserted through the perforations in the lower block, a shackle secured by nuts upon the ends of the lower legs of the king-bolt and having a central nutted bolt, and a bail-shaped yoke or stirrup pivoted with its middle upon the bolt of the shackle and having its upper nutted ends secured in the perforated ears of the upper block, as and for the purpose shown and set forth.

In testimony that I claim the foregoing as my own I have hereunto affixed my signature in presence of two witnesses.

TARGE G. MANDT.

Witnesses:
B. E. WAIT,
WM. B. LITCH.